United States Patent [19]

Chisholm et al.

[11] Patent Number: 4,893,650

[45] Date of Patent: Jan. 16, 1990

[54] ONE WAY HIGH PRESSURE FLOW CONTROL FITTINGS

[76] Inventors: Bill Chisholm, 10 Coachway Rd., S.W., Apt. #171, Calgary, Alberta, Canada, T3H 1E5; Roger E. Frei, Box 8, Site 12, RR #9, Calgary, Alberta, Canada, T2J 5G5

[21] Appl. No.: 242,495

[22] Filed: Sep. 12, 1988

[51] Int. Cl.$^4$ .............................................. F16K 15/04
[52] U.S. Cl. .................................. 137/539; 137/539.5; 184/105.3
[58] Field of Search .................... 184/105.3; 137/539, 137/539.5

[56] References Cited

U.S. PATENT DOCUMENTS

| | | | |
|---|---|---|---|
| 2,776,026 | 1/1957 | Reiff | 184/105.3 |
| 3,421,547 | 1/1969 | Aslan | 137/539 |
| 4,310,018 | 1/1982 | Parr | 137/539.5 |

FOREIGN PATENT DOCUMENTS

| | | | |
|---|---|---|---|
| 197057 | 7/1938 | Switzerland | 137/539 |
| 273602 | 11/1968 | U.S.S.R. | 137/539 |
| 446108 | 4/1936 | United Kingdom | 184/105.3 |
| 851904 | 10/1960 | United Kingdom | 137/539.5 |

Primary Examiner—Robert G. Nilson
Attorney, Agent, or Firm—Stephen D. Carver

[57] ABSTRACT

A jam-proof, high pressure, check-valved input fitting comprising a travel limiting cage for controlling its internal valve spring system to prevent spring bending and cylinderization. A terminal engageably by a high pressure grease source leads to an internal tubular flow passageway comprising axially aligned inlets and outlets separated by a valve seat. A ball valve which contacts the valve seat to control fluid flow is biased by a spring coaxially seated within the upwardly projecting castellated end of the cage. The cage includes symmetrical, radially spaced apart legs and a plurality of relief orifices in the form of radially spaced apart slots defined between adjacent feet. The relief orifices establish fluid flow communication between the outside of the cage and its interior. When compressed downwardly against yieldable spring pressure, the ball is stopped by the cage before the spring can cylinderize. Even when the ball valve is compressed against the cage by several thousand pounds of pressure a blocking seal against the cage cannot be formed by the ball, since the relief slots provide an effective bypass.

3 Claims, 5 Drawing Sheets

ONE WAY HIGH PRESSURE FLOW CONTROL FITTINGS

BACKGROUND OF THE INVENTION

This invention broadly relates to high pressure grease fittings and check valves used in conjunction with pumps, valves, flow actuators, compressors, or similar devices. More particularly the present invention relates to high pressure fittings and check valves in which internal flow control apparatus is employed to reduce or prevent blow-out, plugging or the like.

As will be recognized by those skilled in the art, a wide variety of grease fittings have previously been employed to facilitate the introduction of lubricants and the like into equipment having various moving internal parts. In oil and gas pipeline apparatus such as pumps, valves, flow actuators, and compressors, extremely high pressures may be commonly required to inject lubricants. The dynamic configuration of oil and gas equipment generates significant frictional forces, heat, thermal expansion and contraction, etc., which in time, severely stresses the seals, gaskets, and other internal components, ultimately denigrating the integrity and safety of the equipment. As a remedial maintenance measure viscous sealants, lubricants, grease, or the like, are periodically injected into such equipment. Servicing the equipment in this manner effectively prolongs equipment life and continuity of the system in which the equipment is a part. Those skilled in the art commonly recognize that the viscosity of the sealant, grease, lubricant, or the like, is directly proportional to its sealing and lubricating capability.

"Heavy duty" sealants and lubricants, are quite effective when sealing, high pressure equipment. Typical commercially available lubricating and/or sealing substances, that in addition to being highly viscous, teem with minute solid particles called "bridging agents." These bridging agents aid in sealing the gaps, cracks, leaks, holes, etc., within the equipment being serviced by collectively joining or spanning the opposing sides of the gap, or crack to effectuate sealing. In oil and gas pipeline applications the force feeding of "heavy" grease, sealants, lubricants, or the like, may necessitate input pressures in excess of 15,000 PSI. Typical high pressure grease fittings such as "button-head" fittings are widely used. A button-head fitting allows the grease or injection gun to be securely fastened to the inlet of the fitting during the introduction of the lubricant, or sealant.

However, prior art button head fittings, high pressure check valves, and the like have suffered from a variety of problems. Until now, there has been no button-head styled fitting commercially available which will perform consistently and flawlessly, delivering the injected heavy substance to the equipment being serviced. Hence, because of their design, injection of heavy sealants, or lubricants into the prior art grease fittings has proven quite problematic. Many known prior art fittings in this field of invention employ a "soft seat." This soft seat is formed by a ball, usually of steel construction, forcibly in contact with a non-metallic elastomer ring, washer, or cup. The purpose of the seat is to prevent reverse flow from escaping the fitting through the inlet end, and to prohibit unwanted matter from entering the fitting while not in use. A soft elastomer seat is advantageous because it can facilitate drip tight sealing. However, soft seats wear out quickly when subjected to sustained pressures.

As will be appreciated by those skilled in the art, soft seats can be disadvantageous when the fitting or valve is constantly subjected to high back pressures. At low pressures, a slight leak will cause the seat to "cut-out" (become grooved), often resulting in permanent leaks. At high pressures the whole seat can become distorted, thus limiting the usefulness of the fitting. Considering the nature of heavy sealants, or lubricants, such as they are, a metal-to-metal seal provides adequate sealing for a pressurized highly viscous substance. Because seals wear out so often, it is common to inject fittings with bridging agents, but this tactic results in other problems.

In addition to the unreliability of the seals associated with prior art fittings, the injection of heavy substances has created numerous other problems, such as fitting "plug-off" (clogging). A major cause of this relates to failure of the usual valve element return spring. Spring deformation often results when the check valve element, usually a sphere, depresses the spring into an over compressed state. In addition, spring twisting and bending can occur unless spring movements are rigorously constrained. A severe problem is "cylinderization," wherein the return spring is compressed until its adjacent windings abut one another, and the spring thus forms a cylinder-like or tube. Since the required grease flow path is through the spring interior and through adjacent windings, cylinderization cuts off fitting flow integrity. Hence, flow between successive spring coils is substantially restricted by cylinderization. Further complicating matters, the ball elements common in the vast majority of prior art fittings reposition themselves atop the compressed spring. Consequently, the axial passageway within the spring is also substantially closed off. Hence, the injection pressure may not be dissipated, and blow out of the fitting can occur. When the fitting blows, gas back pressure can result in a calamity. Also, when spring flow is jammed, as when heavy substances clog and obstruct the flow paths, improper lubrication of the serviced device may result. When the grease gun is uncoupled from the fitting, unwanted gas venting may occur. Even if the jammed fitting does provide a seal, when grease input pressure is thereafter relaxed, the accumulated bridging agents may prevent valve closure, resulting in a ruined fitting.

The teachings of the prior art do not suggest an adequate solution to spring cylinderization or fitting plug-off. We have found that all prior art fittings known to us will plug-off at some time, especially when repeatedly injected with the heaviest known sealants, lubricants, and bridging agents. Once a fitting plugs-off, its utility is substantially diminished, and attempts to clear the fitting by increasing the localized pressure within the fitting body will most often result in fitting "blow-out."

"Blowout" occurs when an induced pressure change in a plugged fitting causes the bottom crimp, or retaining ring to fail. Said failure is evidenced by a sudden drop in pressure as indicated by the grease gun pressure gage. When blow-out does occur, the internal parts of the fitting are jettisoned into the equipment being serviced. Now costly and time consuming "blowdown" (evacuation) of the attached pipeline or flow line must be initiated so as to facilitate replacement of the collapsed fitting, and repairs to any damaged equipment. Thus, an object of the present invention is to prevent those events that could possibly lead to fitting blow-out from happening.

It is thus highly desirable for one to develop a fitting which is designed to forbid spring deformations such as cylinderization, and which is immune to fitting plug-off.

The pertinent prior art in this field of invention does not successfully address these problems. United States Pat. No. 4,347,915 employs an offset "leg" of the spring member to cause the ball member to drift to one side when the spring compresses. Theoretically, this ball drift increases the size of the flow channel within the axial hollow portion of the spring, and insures that the flow continues even if the spring is completely cylinderized. However, when very heavy sealants with large bridging agents are injected into the fitting, the ball forces the leg member to bend downward during spring compression and ultimate cylinderization, permitting the ball member to substantially diminish the flow channel. Hence, this fitting has the propensity to plug-off. The latter reference also discloses an internal sleeve member not found in other sources of prior art. The addition of the sleeve is an attempt to prolong the soft seat life, and avoid the soft seat denigration as alluded to earlier. The sleeve does virtually nothing to prevent spring cylinderization and the associated fitting plug-off. U.S. Pat. No. 4,512,441 discloses a stinger assembly employed for ball-to-seat sealing purposes. The spring may still cylinderize within the stinger assembly making plug-off possible.

U.S. Pat. Nos. 2,918,084 and 3,437,082 disclose a variety of spring, ball, and sleeve configurations. There is no means in any these patents by which the spring members are prevented from cylinderizing. More importantly however, the flow paths or channels in each of the above listed patents can be severely diminished and restricted.

In summation, there is a definite need for a flow fitting to withstand high localized pressures, to accept very heavy sealants and lubricants in order to prolong equipment life, and to provide substantially unrestricted flow channels in which the injected sealants, lubricants, or the like, could travel without plugging-off the fitting.

SUMMARY OF THE INVENTION

The present invention comprises high pressure fittings and check valves for use with devices requiring periodic greasing and maintenance, particularly devices such as high pressure oil and gas hardware. Apparatus is internally provided to prevent failure by strictly controlling the valve spring system to prevent deformation, thereby preserving an unblocked flow path. The fittings of the present invention readily tolerate extremely high pressure inputs in excess of fifteen thousand pounds per square inch.

The grease fitting apparatus comprises a rigid, threaded coupling ideally provided with a "button head" fitting. The preferred "button head" terminal is engageable by conventional high pressure grease guns for inputting grease, sealants or the like during maintenance of pumps or other high pressure equipment. Threads of desired configurations may be defined on the outlet portion of the body. A button head inlet communicates with the outlet through an internally defined, generally tubular flow passageway, preferably divided into axially aligned inlet and outlet passageways. Preferably, the cross section of the inlet passageway and the outlet passageway are both circular, and the outlet passageway is of a larger diameter than the inlet. A valve orifice is disposed between the inlet passageway and the outlet passageway for selectively permitting high pressure grease inputted through the inlet passageway to reach the larger diameter outlet portion, for eventual delivery to the device to which the fitting is coupled.

A valve element, preferably in the form of a rigid steel ball, is moved into and out of contact with a valve seat defined between the flow channel passageways to selectively block a valve orifice. The innermost portion of the outlet passageway is internally chamfered, forming the valve seat. The valve element is controlled by a biasing system preferably in the form of a coiled spring. The spring is secured in the bottom of the flow channel, coaxially disposed within the outlet passageway. Importantly, the spring is constrained by a box-like, generally cubical cage. In both grease fitting embodiments the cage substantially surrounds the spring, and it includes a hollow interior receiving at least a portion of the spring. In the first embodiment, the cage is axially biased upwardly by the spring, for controlled movement within the passageway.

The cage may comprise a somewhat circular depression defined in its top, which physically contacts the valve element. The castellated-appearing cage also includes a plurality of lower feet and a plurality of relief orifices in the form of slots defined about its lower periphery. These relief orifices establish fluid flow communication between the outside of the cage and its interior. The feet extend downwardly, pointing towards a lower ring which functions as a stop. Thus, maximum downward deflection of the valve element against the cage establishes contact with the outer rigid portion of the ring. An inner shelf provided in the ring seats and retains the spring. The ring is press fitted into the bottom of the apparatus prior to formation of a restraining crimp which secures the ring in position. Essentially the ring forms a stop which limits cage travel, but the spring could be otherwise mounted against the crimp, such that the stop will result from metal to metal contact between the cage and other portions of the fitting.

The cross section of the cage is substantially polygonal; and preferably a generally cube like structure is employed. The cage interior is generally circular. Although it is free to move axially up and down within the outlet passageway, annular flow passageway regions are thus formed between the outside of the box-like cage and the interior walls of the cylindrical passageway. Thus in operation grease entering the inlet passageway deflects the ball valve element and the cage away from the valve seat, and fluid flow will continue downwardly through the outlet passageway, and through the regions around the cage structure. Fluid will be forced through the cage relief slots into the cage interior, and it will pass between adjacent spring windings, through the center of the spring, and out an orifice. Since the spring cannot be deformed, and particularly since it cannot cylinderize, a positive flow path is maintained.

It is important that some form of relief orifice be defined in the cage, wherein fluids may flow from the exterior of the cage into the interior. Although the configurations employing cage slots are preferred, the apparatus will also function with circular orifice's (or other configurations) like those of the check valve embodiment.

The best mode for a positive flow fitting presently known is centered around the configuration of the cage structure. In the best mode the fitting body will be virtually identical to the previously described structure. An inlet passageway is again separated from an outlet passageway (together comprising a flow channel) by a valve seat. A rigid spherical ball may be moved in and out of contact with the valve seat by a lower coiled biasing spring. However, in this instance, the spring directly contacts the valve ball, projecting upwardly axially from the cage member press fitted into the bottom of the fitting. Fluid flows through the inlet passageway, passes the valve seat and deflects the ball against yieldable spring pressure. Grease can move between adjacent windings of spring, through its tubular interior, exiting from outlet orifice.

When in the quiescent state the ball will be forced against the valve seat as before. However, when the ball is deflected, downward movement thereof will be limited by contact with the upwardly projecting feet of the castellated cage. It is preferred in this embodiment that the cage be substantially tubular with a substantially castellated appearance. Specifically, a plurality of relief orifices, preferably in the form of slots, are defined between adjacent cage feet. In this instance it is preferred that slots be employed for cage venting. Relief slots ensure that grease traveling around the ball can be inputted into the cage interior from which passage is free through the middle of the unjammed spring. Limited grease passage through the cage slots, and through adjacent, uncompressed spring windings will be possible. Again the spring is concentrically disposed within the interior of the cage, which is itself substantially circular in cross section. When pressure is released the spring will force the ball back into contact with the valve seat.

Because of the cage and spring configuration spring bending or twisting is obviated, and it will be impossible to compress the spring fully, since the ball will be stopped by contact with the cage feet. Even when the ball valve is compressed against the cage by several thousand pounds of pressure, a blocking seal against the cage cannot be formed by the ball, since the relief slots provide n effective bypass.

The check valve embodiment can take on a variety of configurations. The head of the check valve includes internal threads so that an appropriate fitting may be coupled to the internally threaded input end. Again a valve seat is employed, and a preferably spherical check valve ball may be moved into or out of contact with the seat. The check valve may employ a cage system as disclosed previously in conjunction with either fitting embodiments previously mentioned. The check valve may, in addition to other cage configurations, employ a cage with a circular relief orifice. In the quiescent state the ball will close the check valve by contact with the valve seat. However, when the cage is forced downwardly, a metal to metal contact with a sleeve will prevent overcompression of the spring. The sleeve is retained in place by a snap ring. A cage of either of the two previously discussed configurations may be employed.

It should also be noted that each of the fittings previously discussed may function as a check valve. Correspondingly, the check valve may function as a grease fitting, if for example a button head fitting is machined onto its body. Each of the cage structures disclosed may be provided with slots, but in the axially slidable cage mode disclosed, either a relief slot or other form of vent or orifice may be employed.

Thus a basic object of the present invention is to provide a flow control device which is immune to plugging and blow-out.

Another basic object is to provide an improved fitting for lubricating valves, pumps, flow actuators, and like devices.

Another fundamental object is to provide a viable solution for the hitherto vexatious problems of spring deformation, such as "cylinderization."

It is also an object of the claimed invention to avoid soft seat sealing, and the attendant leaking problems associated therewith.

A similar object of the present invention is to prohibit fitting plug-off.

An object of the present invention is to provides a means which insures that flow passageways within the fitting remain open for substance flow substantially irrespective of viscosity or pressure.

Another fundamental object is to prevent fitting plug-off or clogging, and the likelihood of fitting blow-out when heavy grease, sealants, lubricants, or similar substances are introduced.

Another object of the present invention is to allow effective end efficient introduction of the heaviest commercially available sealants, so as to seal and service valves, pumps, flow actuators, and the like.

A still further object is to facilitate effective and efficient introduction of the heaviest commercially available lubricants, so as to lubricate and service valves, pumps, flow actuators, and the like.

A further object of the present invention is to provide a means to prolong the useful life of flow regulating equipment, by providing a method of servicing said equipment and limiting equipment down time.

Another object of the present invention is to provide at a nominal cost, a means for servicing said devices and thereby extending the useful life of said equipment. In addition to extending the useful life, the present invention seeks to rarefy equipment failure and the shutdown time associated therewith.

Another object of the present invention is to maintain fitting integrity and stability despite the high pressure introduction of heavy substances.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 28 is a fragmentary vertical sectional view taken generally along line 28—28 of FIG. 26; and,

DETAILED DESCRIPTION

Figure 1:
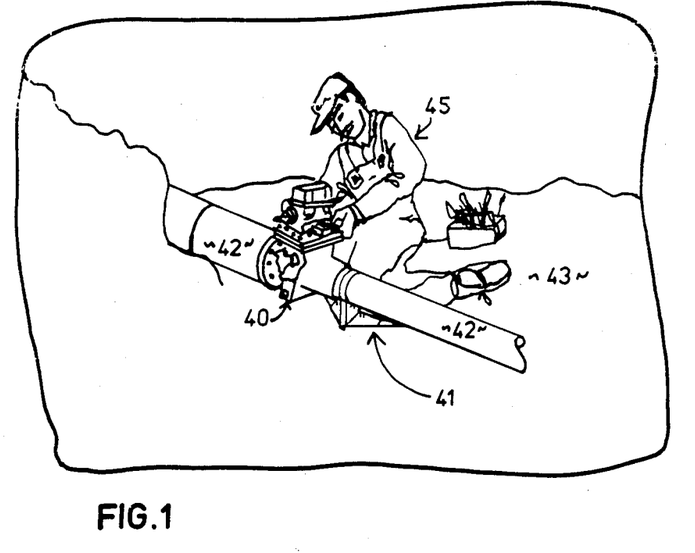
FIG. 1 is a fragmentary, pictorial view depicting an environmental setting in which the claimed invention may be utilized.
Figure 2:
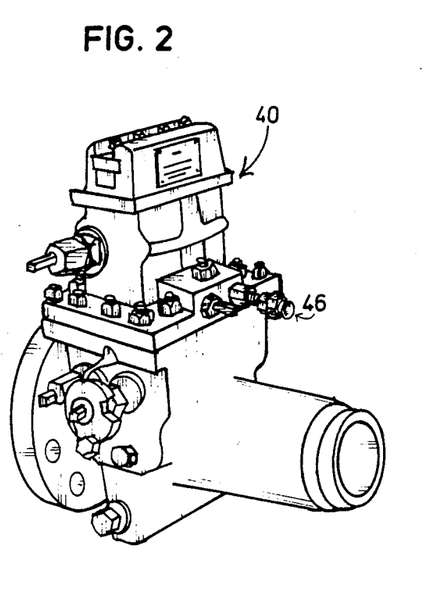
FIG. 2 is a fragmentary, perspective view of the apparatus shown in FIG. 1 with a positive flow high pressure fitting constructed in accordance with the teachings of the present invention mounted on the apparatus.
Figure 2A:
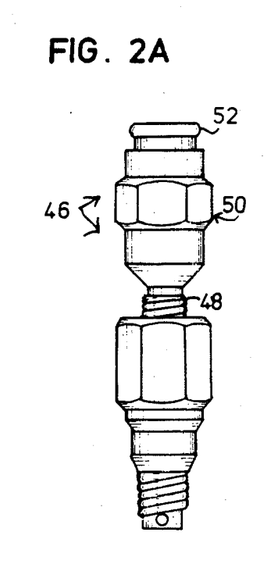
FIG. 2A is a perspective view of a typical fitting and coupling often used in conjunction with pumps such as those disclosed in FIG. 2, and with which the teachings of the present invention may be successfully employed.

With initial reference now directed to FIGS. 1 and 2 of the appended drawings, the inventions of the present invention comprise fittings or check valves which may be ideally employed in conjunction with those devices requiring periodic greasing and maintenance, particularly devices such as pump 40 employed in conjunction with a conventional pipeline 42. Pipeline 42 has been shown in diagrammatic form, and it will be realized that various pieces of support structure 41 will be necessary to elevate various portions of the pipeline over the terrain 43. A worker 45 is illustrated performing maintenance on the pump, and in FIG. 2 it will be noted that fitting apparatus 46 allowing input of grease through the pump 40 is usually employed. As best viewed in FIG. 2A, the fitting 50, with its cap removed, includes a standard male, axially threaded coupling portion 48. Fitting 50 includes upper "button head" structure 52 engageable by conventional grease gun for inputting grease through the fitting 50 so as to periodically maintenance the pump 40 or other high pressure device being serviced. As explained previously herein, extremely high pressures are normally employed in conjunction with such grease fittings, because eventual wear of the fittings may necessitate the use of "bridging agents" to effectuate an appropriate seal. It is of the utmost importance that the apparatus such as fittings 46, 50 be able to withstand extremely high pressure inputs, since proper greasing may require the delivery of input pressures in excess of fifteen thousand pounds per square inch.

In a first mode of the present invention it is contemplated to provide the grease fitting, generally designated by the reference numeral 60, which may be employed alone or in combination with other types of fittings. Specifically, it is contemplated that the various fittings to be described hereinafter, such as fitting 60, may replace fitting 50 of FIG. 2A, or fitting combinations 46 thereof.

Figures 3, 4, 5:
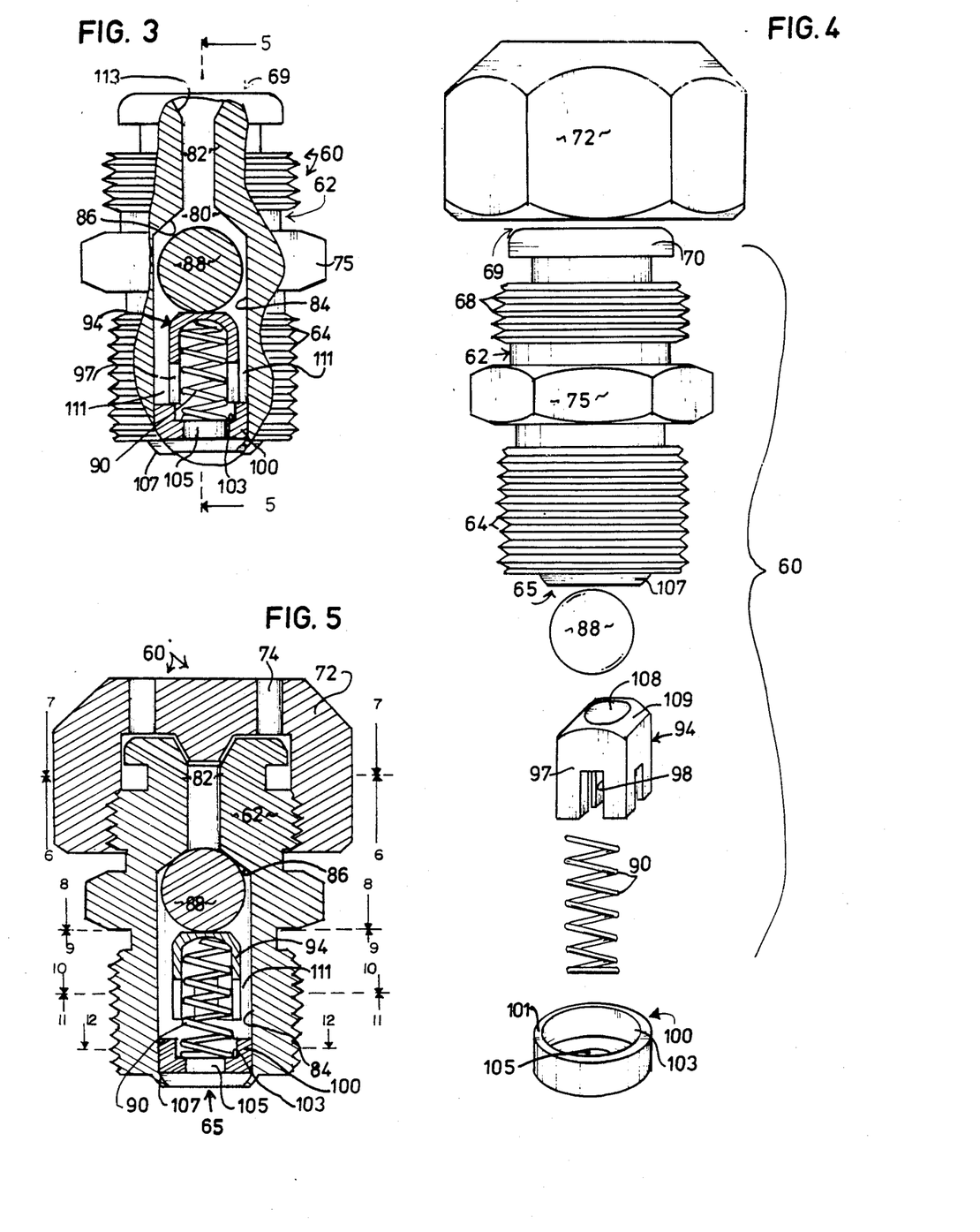
FIG. 3 is an enlarged fragmentary sectional view of a first mode of the present invention, with portions thereof broken away or shown in section for clarity, and with the ball illustrated in a depressed, high pressure input situation.
FIG. 4 is an exploded, fragmentary isometric view of the first embodiment showing the optional accessory cap.
FIG. 5 is an enlarged longitudinal sectional view of the first embodiment, including the optional fitting cap, illustrated in the quiescent mode, taken generally along lines 5—5 of FIG. 3.

Fitting 60 comprises an elongated, generally cylindrical rigid body, generally designated by the reference numeral 62. The fitting 60 may be machined from 4140 billet stainless steel. As best viewed in FIG. 4, the external appearance of the body 62 may be conventional, including lower threads 64 associated with the outlet 65 of the fitting, and upper threads 68 associated with the inlet of the fitting, which has been generally designated by the reference numeral 69. A button head 70 is disclosed in association with inlet 69, and an auxiliary internally threaded cap 72 (not part of the invention) may be assembled as indicated. It should be noted that conventional vent orifices 74 are associated with cap 72 (FIG. 5). Manipulation of the fitting may be accomplished by grasping the nut portion 75.

Figure 6:
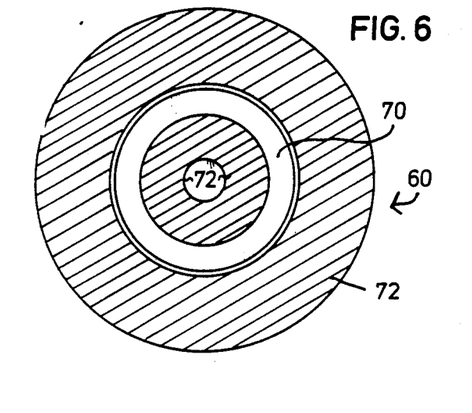
FIG. 6 is an enlarged, vertical sectional view taken along line 6—6 of FIG. 5.
Figure 7:
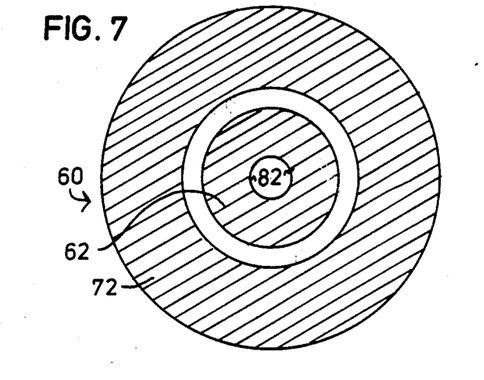
FIG. 7 is an enlarged, vertical sectional view taken along line 7—7 of FIG. 5.
Figure 8:
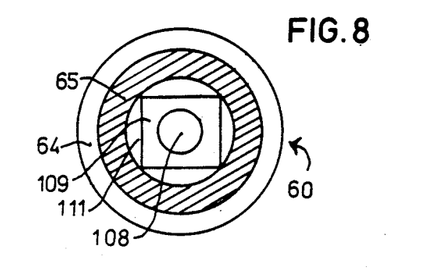
FIG. 8 is an enlarged, vertical sectional view taken along line 8—8 of FIG. 5.
Figure 9:
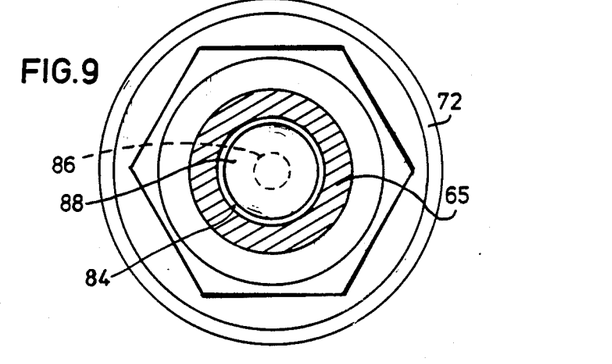
FIG. 9 is an enlarged, vertical sectional view taken along line 9—9 of FIG. 5.
Figure 10:
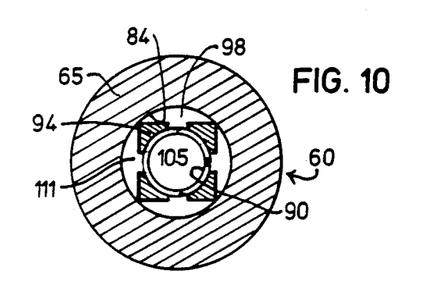
FIG. 10 is an enlarged, vertical sectional view taken along line 10—10 of FIG. 5.
Figure 11:
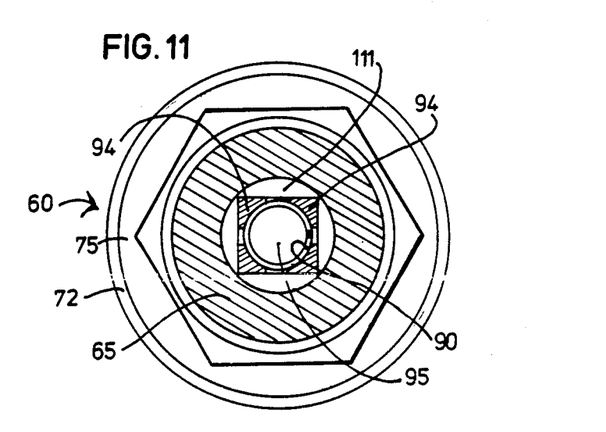
FIG. 11 is an enlarged, vertical sectional view taken along line 11—11 of FIG. 5.
Figure 12:
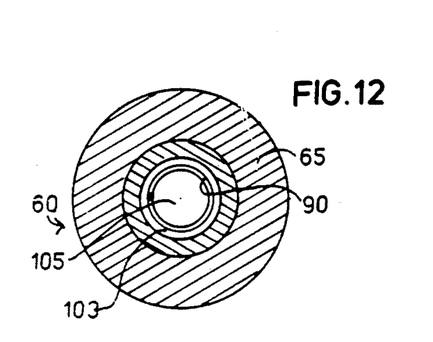
FIG. 12 is an enlarged, vertical sectional view taken along line 12—12 of FIG. 5.
Figure 13:
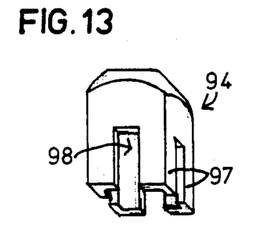
FIG. 13 is an enlarged perspective view of the cage of the first embodiment.
Figure 14:
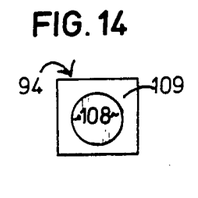
FIGS. 14-16 are enlarged top, bottom, and side views respectively of the cage element of FIG. 13.

The body of the fitting is generally tubular. It includes an elongated, central flow channel generally designated by the reference numeral 79, which extends in fluid flow communication between the inlet passageway 82 and the outlet passageway 84. The comparison of FIGS. 6-11 will reveal that the cross section of the inlet passageway 82 is circular. The cross section of the outlet passageway is also circular, and both passageways are preferably axially aligned. As best seen in FIG. 6, a chamfered valve orifice 80 is disposed between the inlet passageway and the outlet passageway for selectively permitting high pressure grease inputted through the inlet passageway 82 to reach the larger diameter outlet portion 84.

A valve element 88, preferably in the form of a rigid steel ball, may be moved into and out of contact with a valve seat 86 surrounding the valve orifice 80. It will be apparent that the outlet passageway 84, which is of a larger diameter than the inlet portion 82, terminates in the chamfered valve orifice region 80, forming the valve seat 86. FIG. 3 illustrates the blocking valve element 88 in the operational position moved away from the valve seat, which occurs in response to pressure input. FIG. 5 illustrates the valve element 88 in its quiescent position, in contact with valve seat 86 blocking the inlet passageway 82 and orifice 80.

Figure 15:
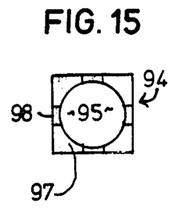
Figure 16:
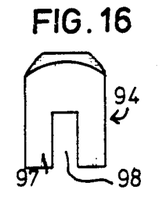
Figure 17:
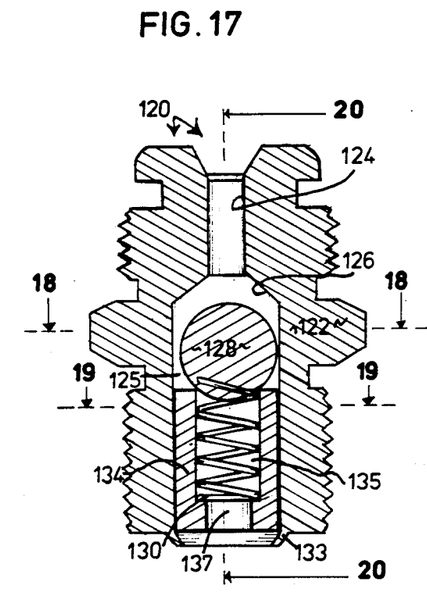
FIG. 17 is an enlarged longitudinal sectional view of the best known mode for a grease fitting (i.e. the second embodiment) of the present invention, with the ball shown in the high pressure state.
Figure 18:
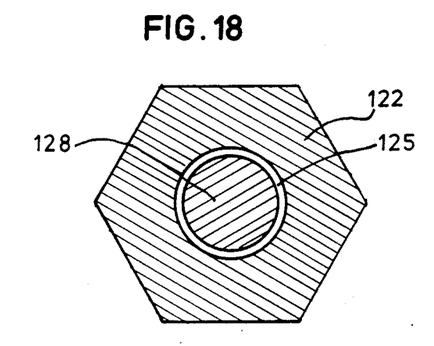
FIG. 18 is a vertical sectional view taken along line 18—18 of FIG. 17.
Figure 19:
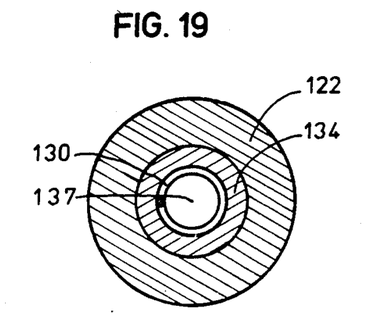
FIG. 19 is a vertical sectional view taken along line 19—19 of FIG. 17.

A biasing system preferably in the form of a coiled spring, has been generally designated by the reference numeral 90. In fitting 60, spring 90 is secured in the bottom of the flow channel, disposed within the outlet passageway. As will be explained hereinafter in conjunction with the discussion of FIGS. 13 through 16, spring 90 is constrained by a box-like, generally cubical cage, generally designated by the reference numeral 94. The cage substantially surrounds the spring 90, and it is in fact biased upwardly (as viewed in FIGS. 3 and 5) by the spring 90, which is snugly received within its hollow interior 95 (FIG. 15).

Cage 94 includes a plurality of lower feet 97 and a plurality of relief orifices 98 in the form of slots defined about its lower periphery. These relief orifices establish fluid flow communication between the outside of the cage 94 and the interior 95. The feet 97 extend downwardly, pointing towards a lower ring 100. As viewed in FIG. 3, maximum downward deflection of the valve element 88 against the cage 94 establishes contact with the upper rigid portion 101 of the ring 100. However, an inner shelf 103 provided in the ring seats and retains spring 90, in fluid flow from the outlet of the body 65 is effectuated through an output orifice 105. A comparison of FIGS. 3 and 5 will also reveal that the cage 94 is disposed within the outlet passageway for axial movements therewithin, and it includes a somewhat circular depression 108 defined in its top 109.

Ring 100 is press fitted into the bottom of the apparatus prior to formation of a travel limiting crimp 107 (FIG. 5) which maintains the ring in position. Essentially the ring 100 forms a stop which limits cage travel, but it will be appreciated by those skilled in the art that the spring could be otherwise mounted against the crimp 107 such that the stop will result from metal to metal contact between the cage and other portions of the fitting.

In embodiment 60, the cross section of the cage 94 is substantially polygonal; and preferably a generally cube like structure is employed. With additional references to FIGS. 13-16, it will be seen that the cage interior 95 is generally circular, but that it has a box-like, preferably square outside periphery. Although it is free to move axially up and down within the outlet passageway, passageway regions 111 are thus formed between the outside of the box-like cage 94 and the interior walls of the passageway 84 (FIG. 3). Thus in operation when grease enters passageway 82, it will deflect ball 88 away from valve seat 86, and fluid flow will continue downwardly through the outlet passageway 84, and fluid flow will continue through the regions 111 around the cage structure 94. When fluid does flow, it will be forced through relief orifices 98 in the cage entering at least a portion of the cage interior 95, and it will pass between adjacent spring windings, through the center of the spring, and out orifice 105 (FIG. 3).

As will be appreciated by those skilled in the art, the cage may take on a variety of configurations. Although illustrated having a square cross section (FIGS. 14, 15) in embodiment 60 will be apparent to those skilled in the art that a cage may take on any of a variety of generally polygonal cross sections. For example, it may be formed in a hexagonal or octagonal configuration, as long as the cage is free to slide within the passageway, and as long as passageways 111 (FIGS. 8, 10) are formed. In each case it is preferred that the generally castellated appearance of FIG. 13 be preserved, and in the best mode feet 97 are disposed in the corners of the cage. It is important that some form of relief orifice 98 be defined in the cage, wherein fluids may flow from the exterior of the cage into the interior 95. Although the configuration of slots 98 are preferred, the apparatus will also function with circular orifice's (or other configurations) as will hereinafter be described in conjunction with the "check valve" embodiment of FIGS. 26 through 28.

Thus in the quiescent state the check valve 88 will abut the valve seat to close inlet passageway 82. When an appropriate grease gun is coupled across the button head fitting, high pressure input through the chamfered valve orifice 80 will cause the ball 88 to be deflected downwardly against cage 94, downwardly depressing the spring 90. However, it will be apparent that spring deformation and compression will be controlled by the policing action of the cage 94. Specifically, it will be apparent that the spring cannot be fully compressed since travel of element 88 is limited by the cage 94 (FIG. 3). The spring windings 90 cannot be tightly compressed so as to form a cylinder. This "cylinderization" factor, often characteristic of known prior art devices, will be completely avoided since the spring cannot be compressed to that limit.

Turning now to FIGS. 17-24, fitting 120 represents the best mode for a positive flow fitting presently known. The primary difference between embodiment 60 and embodiment 120 relates to the configuration of the cage structure. It should be appreciated that the body 122 of the fitting 120 will be virtually identical to the previously described structure. In addition, a conventional cap 72 may be employed, and the threaded regions and button head fitting portions, are all conventional and identical.

An inlet passageway 124 is again separated from an outlet passageway 125 (together comprising a flow channel) by a valve seat, generally designated by the reference numeral 126. A rigid spherical ball 128 may be moved in and out of contact with the valve seat by a lower coiled biasing spring generally designated by the reference numeral 130. However, in this instance, the spring 130 directly contacts the valve ball 128, and the ball may be yieldably deflected toward the cage into contact therewith. The cage member 134 is preferably of a circular profile (FIG. 19) and it is preferably threadably coupled to the body. However, cage 134 may be press fitted into the fitting, axial withdrawal being prevented by the crimp 133. It will be apparent in FIG. 17 that fluid flow through inlet passageway 124, past the valve seat 126, and around the ball 128 within outlet region 125 and into the interior 135 of the cage will be facilitated. Grease can move between adjacent windings of spring 130, and through its tubular interior, exiting from outlet orifice 137.

When in the quiescent state (FIG. 20) ball 128 will be forced against the valve seat as before. However, when the ball is deflected, downward movement thereof will be limited by contact with the upwardly projecting feet 144. It will be noted that it is preferred in this embodiment that the body of the cage be substantially circular (FIGS. 21) and the cage takes on a substantially castellated appearance. Specifically, a plurality of relief orifices, preferably in the form of slots 146, are defined between adjacent cage feet 144. In this instance it is preferred that slots be employed for cage venting, since orifices merely defined in the side of the cage body (as in the check valve embodiment of FIGS 26-28) would not work. Relief slots 146 thus ensure that grease traveling around the ball can be inputted into the cage interior from which passage is free through the middle of the unjammed spring. Also, as best viewed in FIG. 20, limited grease passage through the cage slots 146 and through adjacent, uncompressed spring windings will be possible. Again the spring 130 is concentrically disposed within the interior 135 of the cage, which is itself substantially circular in cross section. When pressure is released (FIG. 20) spring 130 will force ball 128 back into contact with the valve seat, and it will be apparent that spring deformation between compressed and uncompressed states will be avoided.

Figure 20:
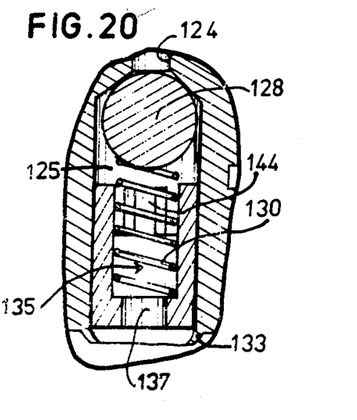
FIG. 20 is an enlarged, fragmentary view of the fitting of FIGS. 17-19 with the ball and springs shown in the quiescent state.
Figure 21:
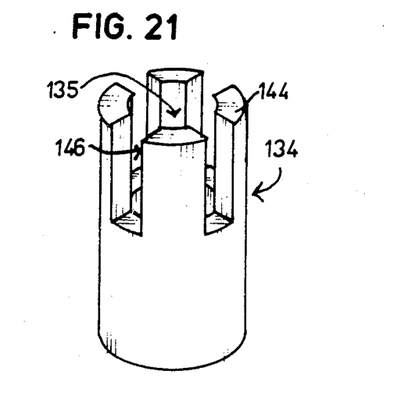
FIGS. 21 is an enlarged perspective view of the cage of the second embodiment of FIGS. 17-20.
Figure 22:
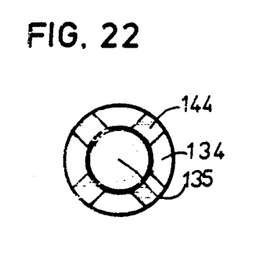
FIGS. 22-24 are enlarged top, bottom, and side views respectively of the cage element of FIGS. 17-21.
Figure 23:
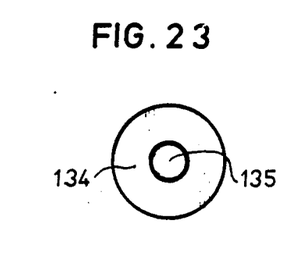
Figure 24:
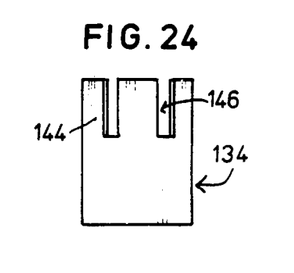

Specifically, because of the configuration disclosed, the opportunity for spring bending or twisting is obviated, and it will be impossible to compress the spring fully, since the ball will be stopped by contact with the cage feet 144. Even when the ball valve 128 is compressed against the cage by several thousand pounds of pressure, a blocking seal against the cage cannot be formed by the ball, since the relief slots 146 provide an effective bypass.

Figure 25:
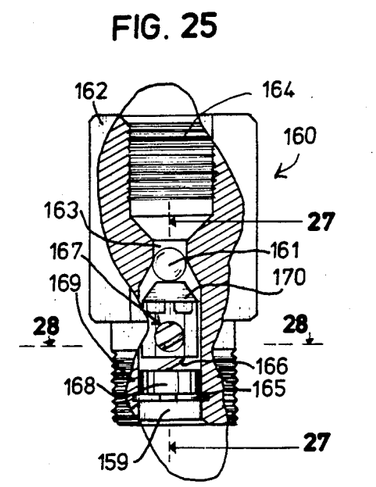
FIG. 25 is an isometric view of a check valve constructed in accordance with the teachings of the present invention, with portions thereof broken away or shown in section for clarity.
Figure 26:
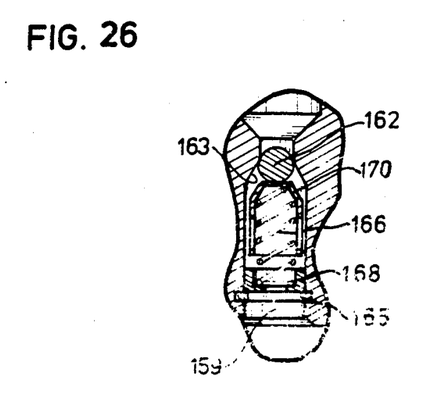
FIG. 26 is a fragmentary longitudinal sectional view taken generally along line 27—27 of FIG. 26.
Figure 27:
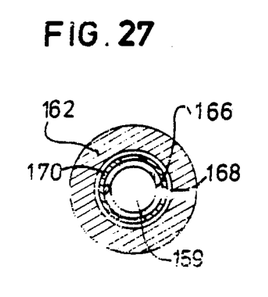

The check valve embodiment 160 of the present invention is disclosed in FIG. 25-27. It should be appreciated by those skilled in the art that the check valve can take on a variety of configurations, and that therefore only one general configuration has been illustrated. The head 162 of the check valve includes internal threads 164 so that an appropriate fitting may be coupled to the internally threaded input end. Again a valve seat is employed, and a preferably spherical check valve ball 161 may be moved into or out of contact with the seat. The check valve may employ a cage system as disclosed previously in conjunction with either fitting embodiment 60 or 120. However, an axially slidable cage member 170 is illustrated, and it receives the upper portion of the coiled spring 166 which is secured within a lower sleeve 168 press fitted into the threaded outlet end 169, circumscribing the outlet orifice 159 of the check valve. In this instance a circular cage relief orifice 167 is employed. In the quiescent state ball 161 will close the check valve by contact with the valve seat 163. However, when the cage is forced downwardly a metal to metal contact with sleeve 168 will prevent over compression of the spring 166. Sleeve 168 is retained by a snap ring 165. Of course the configuration seen in FIG. 17, wherein the preferred cage construction is disclosed, may be employed in a check valve.

It should also be appreciated by those skilled in the art that each of the fittings 60 or 120 may function as a check valve. Correspondingly, the check valve 160 may function as a grease fitting, if for example a button head fitting is machined onto its body. Each of the cage structures disclosed may be provided with slots, but in the axially slidable cage mode disclosed in FIGS. 3 and 26, either a relief slot or other form of vent or orifice may be employed. Also, it should be specifically appreciated that a fixed non axially movable cage structure such as that disclosed in FIGS. 17 and 20 may be substituted for the cage 170 of the check valve 160.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A fitting adapted to be installed upon an apparatus to at least temporarily provide one way fluid flow communication from a source of lubricant, bridging agents, or grease having an output pressure in the order of 10,000 PSI, said fitting comprising:
    a flow channel for conducting substances interiorly through said fitting, said flow channel comprising coaxial inlet and outlet passageways, the outlet passageway having a diameter substantially greater than the input passageway;
    a valve seat disposed between said inlet passageway and said outlet passageway for selectively permitting fluid flow communication between said inlet and outlet passageways;
    a ball valve disposed within said outlet passageway for selectively blocking said valve seat, said ball valve having a diameter greater than the diameter of said inlet passageway but smaller than the diameter of said outlet passageway;
    a spring disposed within said outlet passageway for normally yieldably biasing said ball valve into blocking contact with said valve seat;
    a rigid, castellated cage disposed within said outlet passageway at the bottom of said fitting for controlling said spring during fluid flow to prevent spring deformation and cylinderization and for limiting travel of said ball valve, thereby positively insuring flow through said fitting, said cage comprising:
        a generally cylindrical passageway coaxial with said flow channel and coaxially containing and seating said spring, said cylindrical passageway forming a fluid exit from said fitting;
        a plurality of upwardly extending legs symmetrically radially spaced apart about said cylindrical passageway and said spring for limiting axial displacement of said ball valve to prevent cylinderization and for centering said ball valve to prevent spring twisting and bending; and,
        a plurality of radially spaced apart relief slots defined between adjacent legs providing fluid flow communication to said cylindrical passageway about the periphery of said ball valve;
    whereby positive one way flow is maintained through said valve orifice, around said ball valve, through said slots, between exposed adjacent spring windings, through the hollow interior of the spring partially compressed within said cage, and out through said fluid exit.

2. The fitting as defined in claim 1 wherein said cage is press fitted into the bottom of said fitting.

3. A high pressure check valve adapted to be at least temporarily disposed in fluid flow communication between a pair of external apparatuses for selectively establishing a one-way flow of substances therebetween at pressures in the order of 10,000 PSI, said check valve comprising:
    a flow channel for conducting substances interiorly through said check valve, said flow channel comprising coaxially aligned inlet and outlet passageways, the outlet passageway having a diameter substantially greater than the input passageway;
    a valve seat disposed between said inlet passageway and said outlet passageway for selectively permitting fluid flow communication therebetween;

a ball valve disposed within said outlet passageway for selectively blocking said valve seat, said ball valve having a diameter greater than the diameter of said inlet passageway but smaller than the diameter of said outlet passageway;

a spring disposed within said outlet passageway for normally yieldably biasing said ball valve into blocking contact with said valve seat;

a rigid, castellated cage disposed within said outlet passageway for controlling said spring during fluid flow to prevent spring deformation and cylinderization and for limiting travel of said ball valve, thereby positively insuring flow through said fitting, said cage comprising:

a generally cylindrical passageway coaxial with said flow channel and coaxially containing and seating said spring, said cylindrical passageway forming a fluid exit from said fitting;

a plurality of upwardly extending legs symmetrically radially spaced apart about said cylindrical passageway and said spring for limiting axial displacement of said ball valve to prevent cylinderization and for centering said ball valve to prevent spring twisting and bending; and, a plurality of radially spaced apart relief slots defined between adjacent legs providing fluid flow communication to said cylindrical passageway about the periphery of said ball valve;

whereby positive one way flow is maintained through said valve orifice, around said ball valve, through said slots, between exposed adjacent spring windings, through the hollow interior of the spring partially compressed within said cage, and out through said fluid exit.

* * * * *